Dec. 22, 1959     L. S. LA BARD     2,917,970
CLIP-ON SWIVEL MIRROR FOR EYEGLASSES
Filed March 28, 1957
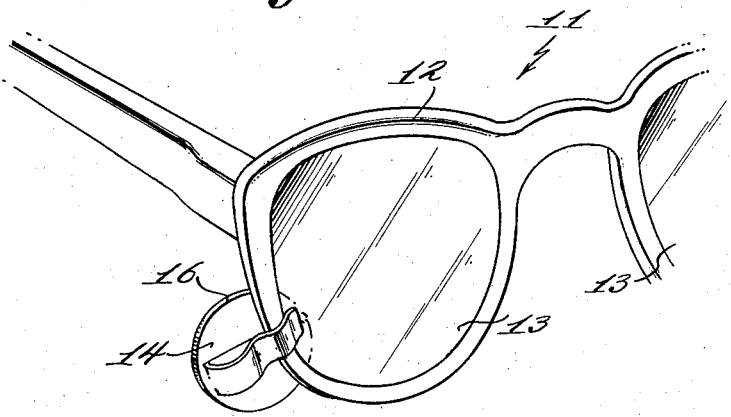
Fig. 1
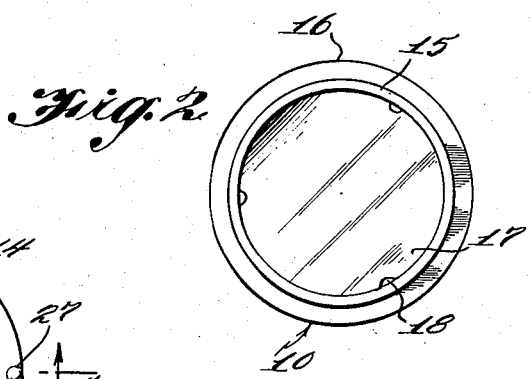
Fig. 2
Fig. 3
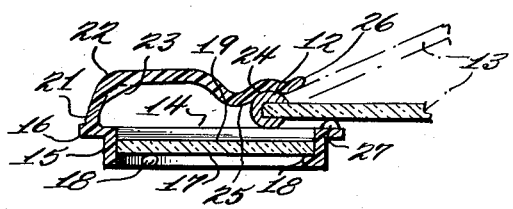
Fig. 4
INVENTOR
LILLIAN S. LaBARD
BY Kimmel & Crowell
ATTORNEYS

United States Patent Office 2,917,970
Patented Dec. 22, 1959

2,917,970

CLIP-ON SWIVEL MIRROR FOR EYEGLASSES

Lillian S. La Bard, New York, N.Y.

Application March 28, 1957, Serial No. 649,245

1 Claim. (Cl. 88—41)

The present invention relates to clip-on swivel mirrors, and more particularly to such mirrors which are adapted to be attached to eyeglass frames.

The primary object of the invention is to provide a clip-on swivel mirror which can be attached to eyeglass frames in a position to afford rear vision to the wearer.

Rear view glasses may be employed as a toy or novelty by adults and children, and also additionally fulfill a serious purpose in providing a rear view for driving, bicycling, detective work, and any other uses in which the turning of the head to obtain a view in an opposite direction is either unsafe or impossible due to the circumstances.

Another object of the invention is to provide a clip-on swivel mirror of the class described above which can be adjusted to provide a variable angle of view as needed.

A further object of the invention is to provide a clip-on swivel mirror having a frame in which a mirror is detachably secured for ready removal and replacement.

A still further object of the invention is to provide a frame and clasp for a clip-on swivel mirror formed integrally from a single casting of semi-flexible resilient plastic.

Another object of the invention is to provide a clip-on swivel mirror which is inexpensive to manufacture, simple to use, and which will be completely effective in providing a rear view for the wearer.

Other objects and advantages will become apparent in the following specification when considered in the light of the attached drawings, in which:

Figure 1 is a perspective view of the invention, shown attached to a pair of spectacles in position for use.

Figure 2 is a front elevation of the invention, illustrating the connection of the mirror to the frame.

Figure 3 is a rear elevation of the invention.

Figure 4 is a transverse cross-section taken along the line 4—4 of Figure 3, looking in the direction of the arrows, and shown attached to an eyeglass frame.

Referring now to the drawings in detail wherein like reference characters indicate like parts throughout the several figures, the reference numeral 10 indicates generally a clip-on swivel mirror constructed in accordance with the invention.

The clip-on swivel mirror 10 is adapted to be attached to a pair of eyeglasses, generally indicated at 11, and includes a semi-cylindrical frame 12 and lenses 13. The clip-on swivel mirror 10 includes a circular disc 14 having a cylindrical flange 15 formed on one face thereof adjacent to but spaced slightly inwardly from the peripheral edge 16 of the disc 14.

A circular glass mirror 17 is positioned within the confines of the cylindrical flange 15 in engagement with one face of the circular disc 14, as is best shown in Figures 2 and 4. A plurality of radially inwardly extending detents 18 are formed on the inner face of the cylindrical flange 15 adjacent the edge thereof opposite the circular disc 14 so as to engage over the edge of the circular mirror 17 to retain the mirror 17 within the flange 5.

A transverse slot 19 extends across the circular disc 14 between the opposite sides of the flange 15. A resilient bowed clasp 20 is integrally formed with the circular disc 14 and is joined thereto at one end of the slot 19.

The clasp 20 has a portion 21 thereof adjacent the disc 14 which extends substantially perpendicularly to the disc 14 for a short distance. The clasp 20 is then bowed to a substantial degree at 22 and is provided on its inner surface with a reinforcing web 23 extending across the bow 22 to restrict the bending thereof.

The clasp 20 adjacent the free end portion thereof is provided with a transverse recess 24 formed in the face of the clasp 20 adjacent the disc 14. The clasp 20 on opposite sides of the recess 24 is provided with detents 25 and 26, respectively, extending toward the circular disc 14, for reasons to be assigned.

The circular disc 14 adjacent the peripheral edge 16 thereof at the end of the slot 19 opposite to the portion 21 of the clasp 20 is provided with an upstanding boss 27, as best shown in Figures 3 and 4.

It should be understood that the plastic material from which the support for the glass mirror 17 is integrally formed, is of a semi-resilient, semi-flexible character to permit the clasp 20 to move outwardly from the circular disc 14, and to be resiliently biased theretoward. Additionally, the placement of and removal of the mirror 17 requires that the flange 15 be flexed to disengage the detents 18 from the mirror 17 so that it can be removed.

In the use and operation of the invention, the clasp 20 is engaged over a frame 12 of a pair of spectacles 11 with the recess 24 receiving the frame 12 therein and with the detents 25 and 26 engaging the opposite sides of the frame 12 to secure the clip-on swivel mirror 10 to the glasses 11. The boss 27 by engaging the glass 13 of the glasses 11 assists in adjusting the angle of the mirror 17 with respect to the eye of the wearer.

The clip-on swivel mirror 10 can be swiveled about the frames 12 to a degree to permit angular adjustment of the mirror 17 with respect to the eye of the wearer.

Having thus described the preferred embodiment of the invention, it should be understood that numerous structural modifications and adaptations may be resorted to without departing from the scope of the appended claim.

What is claimed is:

A clip-on swivel mirror for angularly adjustable attachment to eye-glass frames comprising a flat circular disc of flexible resilient material having opposed parallel faces and an elongated diametric slot, a cylindrical flange integrally formed on one face of said disc adjacent to but inwardly spaced from the peripheral edge thereof and arranged in axial alignment therewith, a circular mirror positioned within said flange in contact with said one face of said disc, a plurality of radially inwardly projecting detents formed in circumferentially spaced relation on the inner face of said flange adjacent the outer edge thereof and engaging over said mirror clamping said mirror in engagement with said one face of said disc, a resilient clasp formed integrally with the other face of said disc adjacent the peripheral edge thereof and extending in spaced relation to the other side face of said disc opposite said flange to a point adjacent to but spaced inwardly from the opposite peripheral edge of the disc, said clasp being of a length and width substantially coincident to the dimensions of said slot, a concave recess formed adjacent the free end portion of said clasp on the side thereof adjacent the other face of said disc, a pair of detents integrally formed on said clasp on opposite sides of said recess and extending toward said other face of said disc for engaging an eye-glass frame positioned between said disc and said clasp whereby said clip-on swivel mirror may be angularly adjusted on said frame and a pivot boss on said other face of said disc adjacent the free end portion of said clasp.

References Cited in the file of this patent

UNITED STATES PATENTS

| | | |
|---|---|---|
| 1,916,110 | Julien | June 27, 1933 |
| 2,176,167 | Comstock | Oct. 17, 1939 |
| 2,622,553 | Wilson | Dec. 23, 1952 |